(12) United States Patent
Hartwell

(10) Patent No.: US 10,617,958 B2
(45) Date of Patent: Apr. 14, 2020

(54) METHODS AND SYSTEMS FOR UPDATING IN-GAME CONTENT

(71) Applicant: GOSUB 60, INC., Santa Monica, CA (US)

(72) Inventor: Joshua Hartwell, Santa Monica, CA (US)

(73) Assignee: GOSUB 60, INC., Santa Monica, CA (US)

(*) Notice: Subject to any disclaimer, the term of this patent is extended or adjusted under 35 U.S.C. 154(b) by 0 days.

(21) Appl. No.: 15/645,028

(22) Filed: Jul. 10, 2017

(65) Prior Publication Data

US 2017/0304733 A1 Oct. 26, 2017

Related U.S. Application Data

(62) Division of application No. 11/768,892, filed on Jun. 26, 2007, now Pat. No. 9,731,202.

(51) Int. Cl.
| | |
|---|---|
| *A63F 13/77* | (2014.01) |
| *A63F 13/332* | (2014.01) |
| *A63F 13/60* | (2014.01) |
| *H04L 12/18* | (2006.01) |
| *A63F 13/525* | (2014.01) |

(52) U.S. Cl.
CPC ............ *A63F 13/77* (2014.09); *A63F 13/332* (2014.09); *A63F 13/525* (2014.09); *A63F 13/60* (2014.09); *H04L 12/1822* (2013.01); *A63F 2300/406* (2013.01); *A63F 2300/552* (2013.01); *A63F 2300/6009* (2013.01); *H04L 12/1859* (2013.01)

(58) Field of Classification Search
CPC .................................................. H04L 12/1859
See application file for complete search history.

(56) References Cited

U.S. PATENT DOCUMENTS

| 6,219,696 B1 | 4/2001 | Wynblatt et al. |
| 2002/0166119 A1 | 11/2002 | Cristofalo |

(Continued)

OTHER PUBLICATIONS

International Search Report and The Written Opinion of the International Searching Authority or the Declaration; International Application No. PCT/US08/68249; International Filing Date Jun. 25, 2006: 8 pages.

(Continued)

*Primary Examiner* — Hsinchun Liao
(74) *Attorney, Agent, or Firm* — Finnegan, Henderson, Farabow, Garrett & Dunner, L.L.P.

(57) ABSTRACT

Systems and methods for updating content of a mobile video game allow for mobile communication devices to receive updated content for video games that operate on the devices. The updates may be promotional in nature, and may be pre-selected based on the device type, service, or service provider. The game may contain instructions that cause the mobile communication device to contact an interface and/or server to receive updated content. After the updated content is received by the mobile communication device, the content may be displayed in-game. The user of the mobile communication device may be provided with one or more options that affect the frequency or ability to receive or display updated content. In addition, the server may track what content has already been received by the mobile communication device.

14 Claims, 7 Drawing Sheets

(56) References Cited

U.S. PATENT DOCUMENTS

| | | |
|---|---|---|
| 2003/0105669 A1 | 6/2003 | Tsuchiya |
| 2003/0224855 A1 | 12/2003 | Cunningham |
| 2004/0049419 A1 | 3/2004 | Knight |
| 2004/0127279 A1 | 7/2004 | Gatto et al. |
| 2004/0266529 A1* | 12/2004 | Chatani .................. A63F 13/12 |
| | | 463/40 |
| 2005/0240476 A1 | 10/2005 | Bigott |
| 2006/0128469 A1 | 6/2006 | Willis et al. |
| 2006/0130046 A1 | 6/2006 | O'Neill |
| 2006/0136297 A1 | 6/2006 | Willis et al. |
| 2007/0022442 A1 | 1/2007 | Gil et al. |
| 2007/0124792 A1* | 5/2007 | Bennett ............... H04M 1/0233 |
| | | 725/133 |

OTHER PUBLICATIONS

International Search Report and The Written Opinion of the International Searching Authority or the Declaration: International Application No. PCT/US08/68250; International Filing Date Jun. 25, 2008; 8 pages.

PCT Notification Concerning Transmittal of International Preliminary Report on Patentability; International Application No. PCT/US/2008/068250 dated Jan. 14, 2010; 7 pages.

PCT Notification Concerning Transmittal of International Preliminary Report on Patentability; International Application No. PCT/US/2008/068249, dated Jan. 14, 2010; 6 pages.

\* cited by examiner

METHODS AND SYSTEMS FOR UPDATING IN-GAME CONTENT

This application is a divisional application of U.S. patent application Ser. No. 11/768,892, filed Jun. 26, 2007, which is incorporated herein by reference in its entirety.

FIELD OF THE INVENTION

The invention relates generally to systems and methods for providing updated video game content to a mobile communication device.

BACKGROUND OF THE INVENTION

Many mobile communication devices (including cellular phones, PDAs, and other handheld devices capable of communicating with a server) are capable of operating video games. Most current mobile communication devices come equipped with one or more games at the time of purchase, and most modern mobile communication devices also allow users to download and/or purchase new games. As mobile communication device technology has advanced, the games available for these devices have become more robust. For example, most current mobile communication devices include color screens that can support games with detailed color graphics, and more content may generally fit onto these screens than on screens of older mobile devices. As a result, gaming on mobile communication devices has become a popular mode of entertainment in a mobile environment.

However, all video games tend to have a popularity life span. As game elements become increasingly familiar to players, the game may hold less surprises and/or no longer present a challenge to the user, at which point the user may stop playing that particular game in favor of others. Because mobile communication devices are generally less powerful than personal computers and stand-alone video game consoles, some games for mobile communication devices may be relatively simple or repetitive by comparison. Typically, games that hold user interest for longer periods of time are more valuable than games that users leave behind quickly. As a result, game creators are always looking for ways to make games that hold the user's interest for a longer period of time.

The recent surge in technical capabilities of mobile communication devices has also spawned attractive new promotional possibilities. Because an extremely large number of people worldwide own mobile communication devices, many third parties may wish to advertise within the screen of a mobile communication device. In particular, when a user plays a game on the mobile communication device, the user's full attention may be directed to the screen of the mobile communication device. Therefore, providing in-game advertising space in the palm of the user's hand is an attractive proposition for both buyers and sellers of the space.

Permanent advertisements within a video game that is played on a mobile communication device may be presented in various ways. For example, the background of the video game might contain a permanent advertisement for a third party. In most cases, this advertisement would generate revenue for the maker of the game, while also serving as a valuable promotional opportunity for the third party.

However, the potential popularity of a mobile communication device game may be unknown until after the game is released to the public. Even then, it may be difficult to gauge how long the game will keep its popularity. This creates uncertainty in the process of buying and selling promotional space within a video game. Specifically, because long term popularity is difficult to determine, both the game company and the third-party advertiser may find valuation of the permanent in-game advertisement space difficult. The third party may not want to pay for a permanent ad that spans the lifetime of the game, when the success of the game is relatively uncertain.

It is accordingly an object of the invention to provide systems and methods for updating in-game content on a mobile communication device. Some embodiments may prolong user interest in a game for a mobile communication device, and make promotional opportunities more predictable and/or desirable, as follows.

SUMMARY OF THE INVENTION

In accordance with embodiments of the invention, systems and methods for updating in-game content on a mobile communication device are provided.

In an embodiment, a mobile communication device may comprise a screen for viewing by the user, a processor, and a memory. The memory may contain instructions that, when executed by the processor, cause the communications device to operate a video game, contact a server to check for updated content to use in the video game, download the updated content to the communications device from a server, and display the updated content within the video game. The video game itself may be presented on the screen.

The displayed content may be, for example, promotional content. The content may be displayed within the game at a location based on user interaction.

In addition, various steps may exist for checking updated content on the server. For example, checking for updated content on the server may be performed upon launch of the video game, in some embodiments. The check may also be performed upon request by a user of the mobile communication device. In addition, checking for updated content may also be performed periodically.

In some embodiments, the mobile communication device may receive and utilize a message from the server in response to checking for updated content. For example, the message may contain information that is displayed to the user. Alternatively or in addition, the message may describe updated content available at the server.

The communications device may, in some embodiments, check whether the updated content should be downloaded before downloading the updated content from the server. If downloading is appropriate, the communications device may send a follow-up request to the server indicating that the user wishes to download the updated content from the server. Subsequently, the communications device may download the updated content.

Another embodiment disclosed herein includes a computer-readable medium containing instructions for execution by a mobile communication device. The instructions may cause the mobile communication device to operate a video game, contact a server to check for updated content for use in the video game, download the updated content to the communications device, and display the updated content within the video game. The video game may be presented within a screen controlled by the mobile communication device.

A method for distributing updated content to a communications device for use in a video game that runs on the communications device is disclosed herein. In an embodiment, the method may comprise the steps of storing updated content on a computer-readable medium, receiving a request for updated content from a mobile communication device, the updated content being usable in a video-game that already exists on the communications device, and uploading content to the communications device from the server, the content being usable when the video game operates on the communications device.

For example, the content may be promotional content. Information may be sent to the communications device regarding the in-game placement location of the content. In addition, the content may include a helpful tip or suggestion to the user of the video game.

Some embodiments may include the additional step of checking whether the communications device should receive the updated content before uploading the updated content to the communications device. In addition, the method may call for tracking what updated content has been uploaded.

Further, some embodiments may include a system for distributing updated video game content to a communications device. The system may comprise a storage medium for storing updated content for use in a video game, a server in communication with the storage medium, and an interface coupled to the server and a network, wherein the interface receives a request for updated content from the communications device over the network. In some systems, the server may be operative to receive a request through the interface and utilize the request to send the updated content from the storage medium to the communications device, the content being displayable in a video game on the communications device.

The content may be promotional content. In addition, the server may send information to the communications device regarding the in-game placement location of the content. The server may send a message to the mobile communication device in response to receiving the request, the message relating to the content. In some embodiments, the message is pre-selected by the server based on a model type associated with the communications device, a service subscription associated with the communications device, or a service provider for the service subscription associated with the communications device.

Further, the server may store an indicator of whether the mobile communication device should receive the updated content. In these embodiments, the server may check the indicator before uploading the updated content to the communications device. The server may also track the distribution of updated content.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with the description, serve to explain the principles of the invention.

DESCRIPTION OF THE EMBODIMENTS

Figure 1:
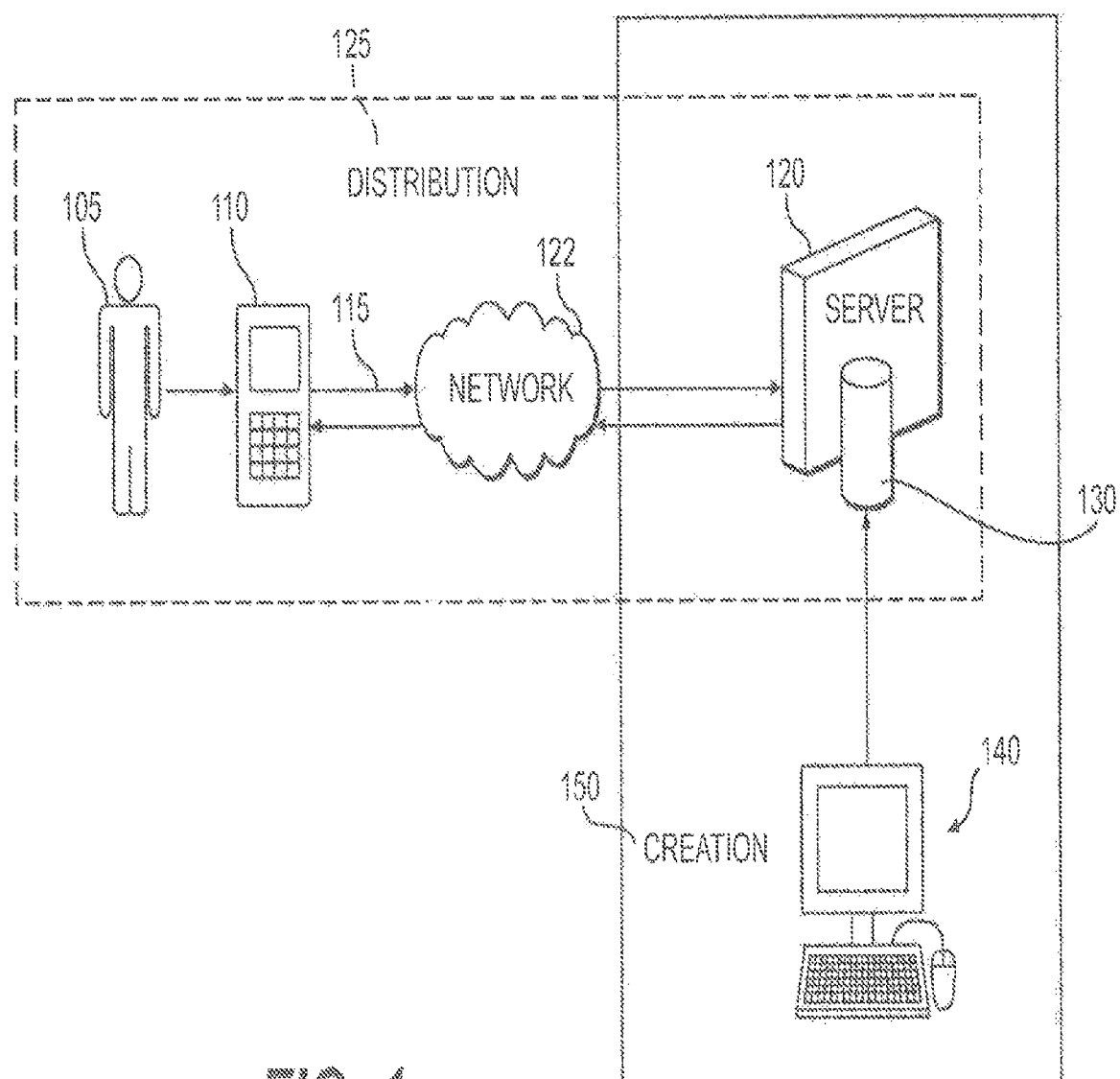
FIG. 1 is an overview diagram of exemplary components used to update in-game content on a mobile communication device in accordance with some embodiments of the present invention.

Reference will now be made in detail to the present exemplary embodiments of the invention, examples of which are illustrated in the accompanying drawings. Wherever possible, the same reference numbers will be used throughout the drawings to refer to the same or like parts.

It is to be understood that both the foregoing background description and the following detailed description are exemplary and explanatory only and are not restrictive of the invention as claimed.

This application incorporates by reference in its entirety the U.S. Patent Application entitled "Systems and Methods for Providing In-Game Hot Spots," filed concurrently with this application.

As used herein, a server includes any remote system capable of receiving communication from a handheld device over a network, such as the Internet, intranet, local area network, telecommunications network, and/or Ethernet.

An embodiment of the invention described below allows a game company and/or provider to provide updated content to a mobile communication device for use in a mobile video game that operates on the mobile communication device. The ability to update in-game content may allow game companies to keep game elements fresh and prolong user enjoyment of the game. For example, a particular scene within the game may be rearranged so that the user has something new to look at or explore. In one embodiment, the updated content may comprise a new level within the game. In addition, the game company may charge third-party advertisers a fee per downloaded promotional update. Consequently, the game may sustain its popularity and be more profitable for the game creator than existing mobile communication device games.

The game may be more attractive to third-party advertisers and provide promotional revenue for the game provider. An embodiment may provide an avenue for selling time blocks of in-game advertising. Third parties may now have the option to advertise for a period of time, rather than permanently, within a video game for a mobile communication device. This flexibility may allow the negotiation of promotional contracts that involve less guess-work with respect to the placing advertisements or virtual products within a video game on a mobile communication device. Further, an embodiment herein also provides promotional opportunities for third parties that could not previously afford to place advertisements within a game for a mobile communication device. For example, while purchasing a promotional spot that lasts the lifetime of the game may not be feasible, it may be much cheaper to purchase a smaller block of time.

In some embodiments, advertisements may be tracked on a per-view or per-download basis. In these embodiments, it may be possible for the game company and/or distributor to profit based upon when promotional content is downloaded and/or viewed.

In addition, local third party advertisers may be able to place promotional content on mobile communication devices located within a proximity to the locality.

The ability to place updated content within the game may also provide an avenue for signing additional promotional contracts after the game has already been publicly released. For example, in a previously-released game, a bar scene might be filled with updated bottles that show a company logo not present at the time of the game's launch. The ongoing promotional aspects of such a system could be very attractive to both buyers and sellers of promotional space.

FIG. 1 is an overview diagram of exemplary components used to update in-game content on a mobile communication device in accordance with several embodiments of the present invention. Turning to FIG. 1, both a distribution block 125 and a creation block 140 are shown. In the distribution block 125, the user 105 plays a mobile video game on mobile communication device 110. In some embodiments, the game includes instructions to check 115 for updated content at server 120. The mobile communication device may perform this check 115 by connecting to server 120 through network 122.

In some embodiments, the mobile communication device 110 may contain a processor and a memory. The program instructions for the mobile video game may be located in the memory and executed by the processor, causing the game to operate on the mobile communication device. The mobile communication device may also contain a screen for displaying the mobile video game to the user 105.

The network 122 may include, for example, the global internet. Alternatively or in addition, the network 122 may include a phone or data network. In an embodiment, the mobile communication device 110 may connect to an interface (not shown) that may, in turn, pass a request for updated content to server 120. The interface may be part of server 120 or a separate device, depending on the embodiment. For example, the interface may receive communications from the network, validate the communications as coming from a known or compatible source, and then relay the communications to the server 120. In addition, server 120 may actually be implemented as one or more servers.

In the example of FIG. 1, updated content for a particular mobile communications device is stored on a data storage medium 130 as part of a group of pre-selected content for the mobile communications device. In this example, the data storage medium 130 is computer-readable. Potential data storage mediums include a hard drive, memory (such as RAM), and other storage devices (e.g., flash memory, a USB drive, compact disk, DVD, tape, or other media). The data storage medium may be implemented by one or more distinct storage mediums. In some embodiments, the updated content may be organized or indexed by a database of pre-selected content. The storage medium 130 may be a part of server 120 in some embodiments.

After server 120 receives a communication request from mobile communication device 110, server 120 may check whether updated content is available for one or more mobile video games. If updated content is available, server 120 may send or provide (i.e., upload) the updated content to mobile communication device 110. Other steps, such as performing a check of whether the user wishes to receive the updated content, are possible in some embodiments. For example, the server 120 may store an indicator of whether updated content should be sent to the particular mobile communication device 110. Additionally, before the updated content is downloaded, the user 105 may be prompted by mobile communication device 110 to make sure the user 105 wishes to add the updated content to the mobile video game.

Other user information may also be utilized to determine which updated content to download, such as the sex, age, or interests of the user. Other checks are also possible, such as the geographic location of the user. In one embodiment, the user may be queried for this information. In another embodiment, the mobile communications device automatically transmits the information to the server and/or the server stores the information for later use.

Once the updated content has been downloaded by mobile communication device 110, the content may be placed in-game (i.e., within the video game environment). The updated content may replace or supplement previously existing content within the game. For example, the updated content may be a new background, or it may include a new item that the user interacts with in-game.

The updated content may be loaded into the server 120 and/or storage medium 130 from any number of external sources (although typical server access restrictions may apply). In FIG. 1, computer 140 may upload the updated content to the server 120. In other embodiments, the updated content may be created on server 120. In still other embodiments, a user 105 may have the option create the updated content. For example, some embodiments may allow the user 110 to upload a picture to server 120, either via the mobile communication device 110 or some other device, such as a personal computer. An embodiment may also allow for the picture to be used as part of the updated content.

The server 120 may be in communication with the storage medium 130 that contains the updated content so that the updated content may be retrieved and sent to the mobile communication device 110.

Figure 2A:
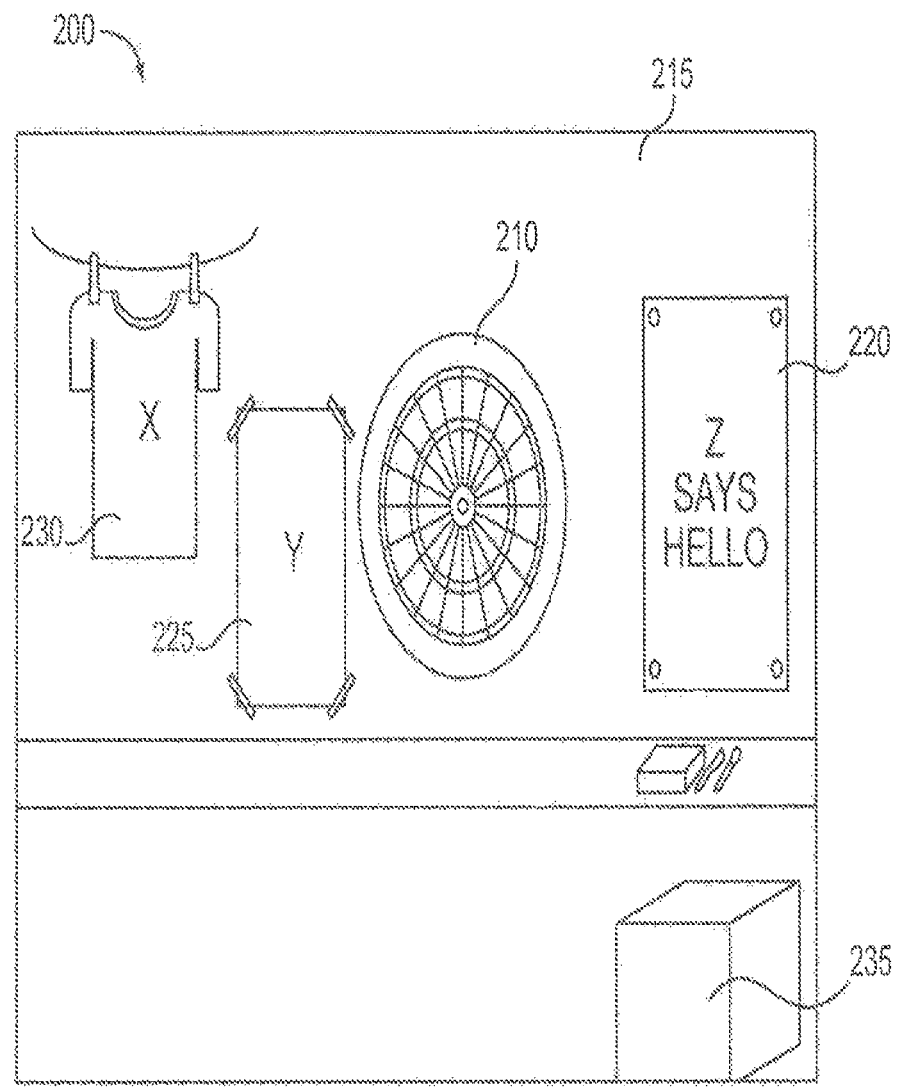
FIGS. 2A-B are diagrams of an exemplary scene in a video game played on a mobile communication device in accordance with some embodiments of the present invention.
Figure 2B:
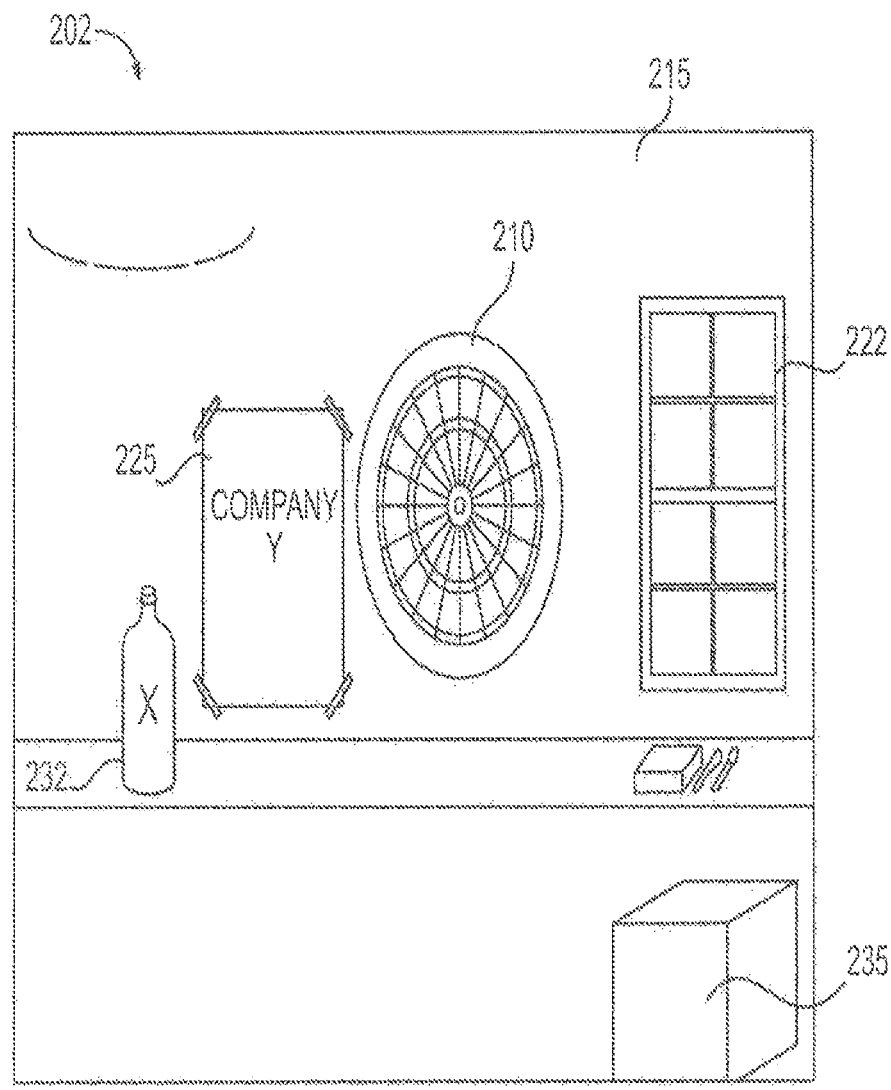

FIGS. 2A-B are diagrams of an exemplary scene in a mobile video game played on a mobile communication device in accordance with several embodiments. The exemplary screen is from a darts game, which includes dart board 210. However, embodiments disclosed herein may benefit all types of mobile video games, and are not limited to darts games or any other particular type of mobile video game that is available for mobile communication devices.

Turning now to FIG. 2A, several items 210, 220, 225, 230, and 235 are shown within scene 200. In this example, virtually any of these items may be changed by receiving updated content on the mobile communication device. For instance, the shirt 230 might be updated to include a logo associated with third party X (as shown). The poster 225 might advertise an upcoming movie for third party Y, and chalk board 220 may contain a handwritten advertisement for third party Z (as shown).

The timing of updated content becoming available may be driven by promotional contract terms, such as with third parties X, Y, and Z. In this example, when the promotional contract with third party X ends, the logo on shirt 230 may be removed. In addition, the mobile communication device may thereafter download updated content reflecting a new graphic, shirt, or entirely new object, to place at 230. The updated shirt 230 may not even be promotional item, or it may advertise the in-game availability of a promotional spot. As an example, the shirt may be replaced with a sign that states "space available." Localized promotional content may removed and/or replaced in a shorter time frame if the mobile communication device enters a new local area with different localized promotional content in some embodiments.

Turning to FIG. 2B, if third party X is a beverage company, a beverage 232 resembling those made by third party X could be placed within scene 200. In the example in FIG. 2B, the blackboard may be replaced with updated content, such as window 232. This may be done, for example, if the promotional contract with third party Z ends. Alternatively, the text on blackboard 220 of FIG. 2A may be erased and/or replaced with new text.

Other content of the mobile video game, such as the shape, design, coloring of dartboard 210 or the texture or coloring of background 215 may be updated. In other games, new weapons, interactive characters, levels, hot spots, and other items may be provided as part of the update. In short, any content element used in the mobile video game may be updated, depending on the embodiment.

Figure 3A:
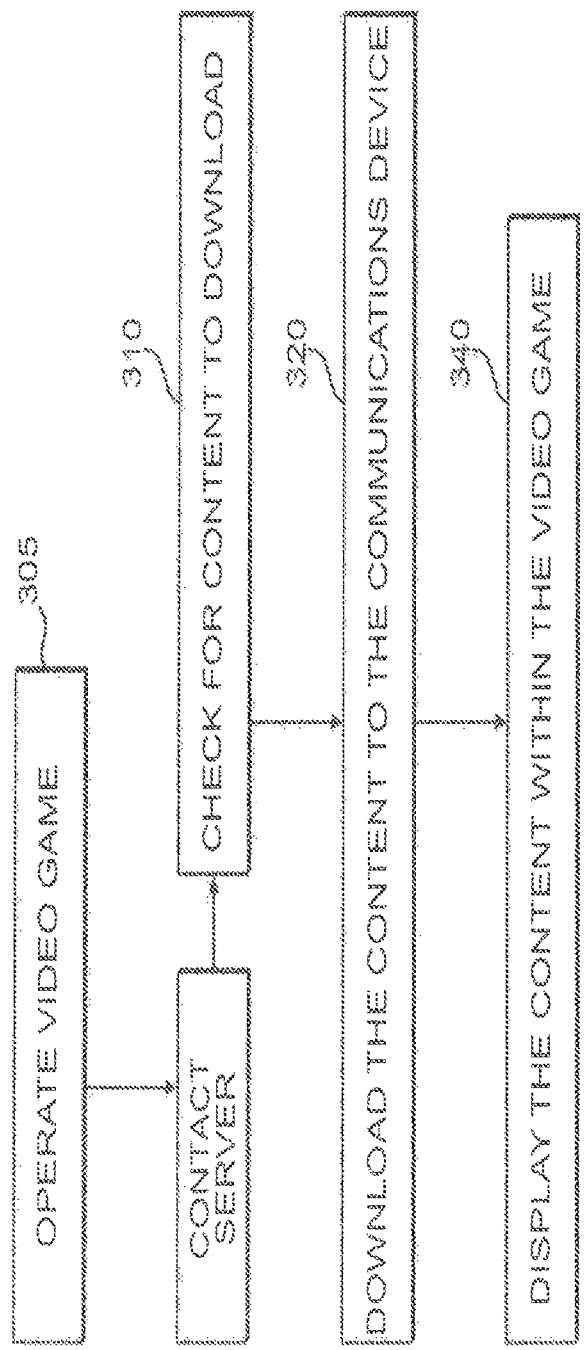
FIGS. 3A-B are exemplary flow charts that include steps taken by a mobile communication device to update in-game content in accordance with an embodiment of the present invention.
Figure 3B:
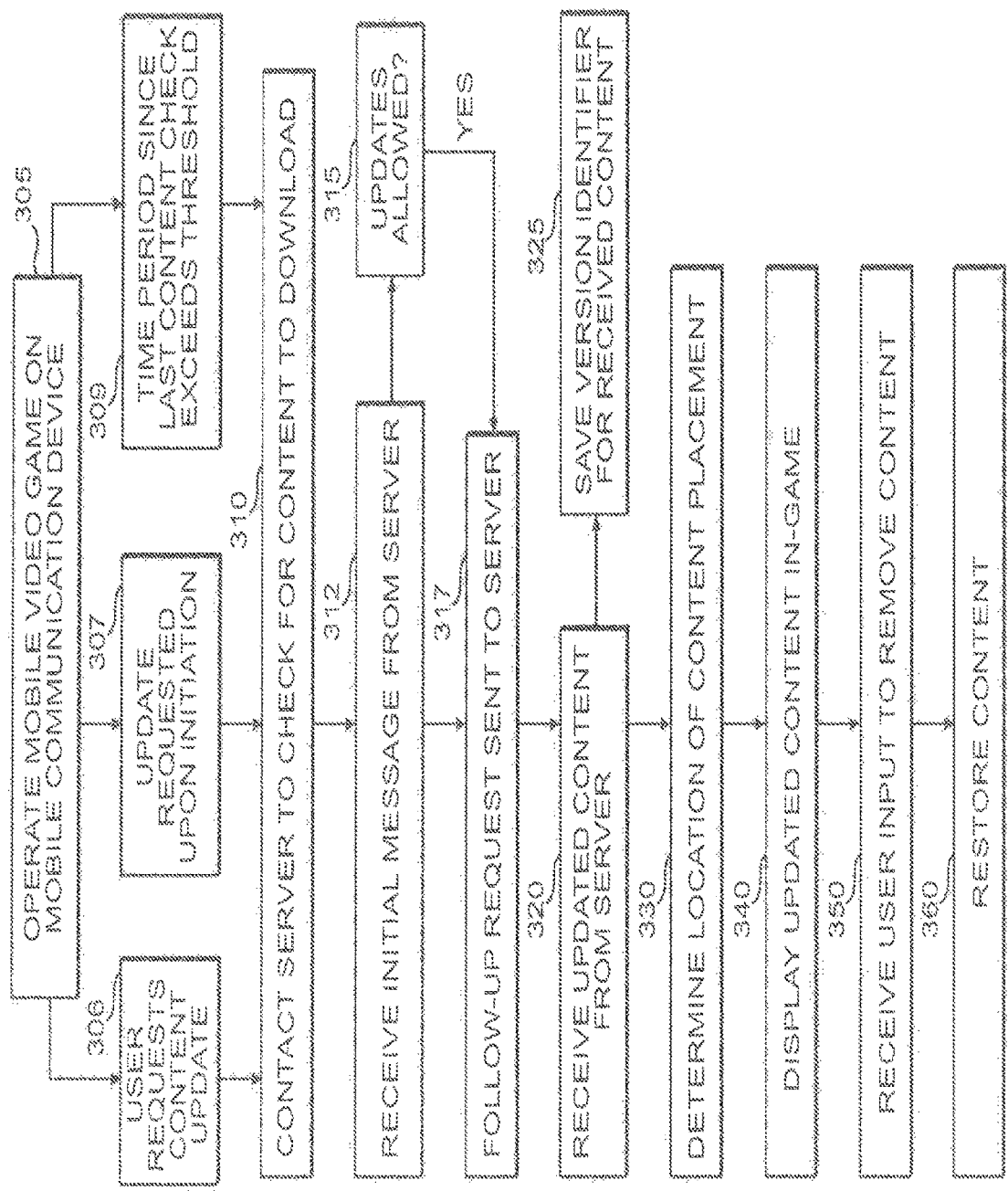

FIGS. 3A-B are exemplary flow charts that include steps taken by a mobile communication device to update in-game content in accordance with an embodiment of the present invention. Turning to FIG. 3A, the mobile communication device operates a mobile video game at step 305. The mobile video game may be any type of game operable on a mobile communication device.

At step 310, the mobile communication device may contact a server. As will be explained in more detail with reference to FIG. 3B, contacting the server may be triggered by many different events and occur at many different times, depending on the embodiment. The mobile video game may be concurrently operating in some embodiments, or not operating in other embodiments.

After the server has been contacted, at step 310, the mobile communications device checks for an available update for the mobile video game. If updated content for the mobile video game is available, the mobile communication device may begin downloading the content at step 320. The length of time that passes between contacting the server at 310 and downloading the updated content varies between embodiments and depends on many factors, some of which are discussed in more detail with reference to FIG. 3B. For example, other communications, such as an authorization to download files, may occur before downloading begins in some embodiments. Alternatively or in addition, downloading may be delayed in an embodiment until a time when more bandwidth is available or when downloading will not disrupt game play.

At step 340, the mobile communication device may display the updated content within the mobile video game (i.e., in-game). For example, the shirt 230 from FIG. 2A may be removed and replaced with the bottle 232 from FIG. 2B. The exact timing of when the updated content is displayed in-game varies depending on the embodiment.

Additionally, user interaction within the game may determine the location of content placement. For example, motion sensing devices within the mobile communication device may be used to determine where the updated content is displayed within the gaming environment. In one such embodiment, the user may make a throwing motion while holding the mobile communication device, which detects the motion and displays a thrown dart on dartboard 210 along with a message based upon the updated content. The mobile communication device may detect the motion via a camera component of the mobile communication device. In another embodiment, motion is detected by one or more gyroscopes within the mobile communication device.

Some embodiments may require the user to agree to display the content before the updated content is displayed. An embodiment might also include presenting the user with a message explaining the updated content. For example, before the updated content is displayed, the user might be presented with a message that states "X would like to redecorate this room". In some of those embodiments, the user may have the option of accepting or declining the display of the updated content.

The updated content may also be displayed in a pop-up window. Pop-up windows that are spawned from the operation of the game are considered to be in-game for the purpose of this disclosure.

Turning now to FIG. 3B, a more elaborate set of exemplary steps followed by a mobile communication device in some embodiments is presented. At step 305, the mobile communication device may operate a mobile video game.

Unlike in FIG. 3A, FIG. 3B includes intervening steps 306, 307, and 309 for triggering checks for updated content. Requests (i.e., checks) for updated content may or may not specify particular content, depending on the embodiment. For example, the mobile communication device may not know what updated content, if any, is available when the mobile communication device contacts the server at step 310. In some embodiments, the mobile communication device may identify a particular game, scene, and/or element within the game when it contacts the server. In other embodiments, the mobile communication device may request updated content for several games during contact with the server at step 310.

Some of the methods for triggering a content update will now be discussed. In some embodiments, the user may manually request updated content at step 306. For example, the video game operating on the mobile communication device may include a selectable option to retrieve updated content. Selecting this option may cause the mobile communication device to immediately contact the server and check for content to download at step 310 in some embodiments. Alternatively, there may be further options, including retrieving updated content when the game ends or at some other time.

In one embodiment, the mobile communication device may request updated content upon initialization of the video game. For example, when the game is selected or otherwise initialized by the user, the mobile communication device may automatically contact the server to check for content to download at step 310. In some of embodiments, the check may not be performed automatically on every startup. For example, upon initializing the game, the mobile communication device may check how much time has passed since the previous updated content download before automatically contacting to the server at 310. In those embodiments, the mobile communication device may track the dates of one or more previous content updates.

In some embodiments, at step 309, the mobile communication device may connect to the server to check for updated content when the time period since the last request for updated content exceeds a threshold. As previously stated, in some embodiments step 309 is combined with step 307. In other embodiments, the time period since the last update is checked at times other than upon initializing the game. For example, upon reaching a certain level or scene in the game, the mobile communication device may examine the last time the game, level, and/or scene was updated. If the time period exceeds a threshold, then the mobile device may contact the server at 310. The threshold time period between updates may vary depending upon the game and the embodiment. In some embodiments, the user may be able to increase or reduce the frequency of content updates by lowering or raising the threshold period. Those skilled in the art will appreciate that a user with lower bandwidth limits may not want to check for updates as often as a user who has higher limits in their service plan.

In other embodiments, the mobile communication device may utilize a separate scheduler program to schedule a request for updated content. When the scheduled time for checking for updated content arrives, the mobile communication device may contact the server. The video game may not be operating while the request is sent in some of those embodiments. Alternatively, at the scheduled time, the mobile communication device may launch a component of the game to request updated content from the server.

At step 310, the mobile communication device may contact the server to check for updated content to download. Contacting the server may be accomplished by using the network accessible by the mobile communication device in an embodiment. Some embodiments may contact the server over the Internet, while other embodiments may require traversing other types of networks to contact the server. In some embodiments, the server is contacted by first connecting to an interface. The interface may validate the mobile communication device as belonging to a particular service and/or confirm that the mobile communication device is configured and/or allowed to receive updated content.

Other embodiments may not contact the server unless the user has selected a game option that allows content updates. In some of those embodiments, if the user requests a content update at step 306, the request may override current settings concerning whether content updates are allowed.

In some embodiments, when the mobile communication device contacts the server, the mobile communication device may send the server one or more version identification numbers for content currently on the mobile communication device. The server may use these version identification numbers to determine if the mobile communication device already has downloaded some or all of the updated content available for download. In those embodiments, sending the version identification number may help eliminate downloads of duplicative updated content. In one embodiment, the mobile communication device may execute a checksum algorithm on the version identifier (and/or compare the identifier to locally-stored data) to determine whether the updated hot spot associated with the version identifier has already been downloaded. Any known algorithm for checking whether content has previously been downloaded, thus reducing download redundancy, may be used in an embodiment.

Before reaching step 312, the server in some embodiments may verify whether the mobile communication device should receive content updates before sending the updated content. To make this verification, the server may track whether the mobile communication device should receive updated content.

At step 312, the mobile communication device may receive an initial message from the server. In some embodiments, this message may alert the user of available updated content and/or ask the user whether they wish to receive the updated content. For example, an embodiment may require the user to allow the updated content at step 315 in order for the content updating process to continue. The initial message, presented at step 312, may be influenced by whether the server data suggests that the mobile communication device should receive updates. For example, the initial message received at step 312 could be a message specifying that the mobile communication device is not configured to receive updated content. The initial message may also describe the features of the updated content to aid the user in deciding whether to download the content. In addition, the initial message may also specify details about the available updated content, such as file size, number of files, and/or estimated download time. In some embodiments, parameters may be set so that this presentation and/or authorization is bypassed.

The initial message may also include information for use by the mobile communication device that is not displayed to the user. For example, the initial message may provide information that helps the mobile communication device to internally check what available updated content is already present on the mobile communication device. In some embodiments, this may allow the mobile communication device to present the user with only those new content features that the mobile communication device has not already implemented. In one embodiment, the mobile communication device may execute a checksum algorithm on at least a portion of the received message (and/or compare the message to locally-stored data) to determine whether the updated content associated with the message has already been downloaded.

In addition, the initial message at step 312 may be promotional in nature. For example, the message may state "X would like to redecorate this scene." Therefore, even if the user declines the update, an embodiment may still promote the third party (e.g., X) in a certain way without requiring the download. Sending a promotional initial message at step 312 may also provide the game company with a means of tracking the number of times users view promotional content. This embodiment also may allow a game company to charge the advertising third party on a per-view basis. In other words, the game company may profit for each time the promotional initial message is presented to a user at step 312.

The initial message may be pre-selected based upon at least one of the factors including a type of the mobile communication device, a telecommunication service, a subscription associated with the mobile communication device, and a service provider of the telecommunication service. For example, a particular service provider may wish to provide an initial message that thanks the user of the mobile communication device for using their services. In another example, newer mobile communication devices may be able to display a more elaborate initial message, so distinguishing among types of mobile communication devices may allow a game provider to maximize the experience on each type of mobile communication device.

Continuing at step 317, the mobile communication device may send a follow-up request to the server. The request may include whether or not the mobile communication device should receive the updated content. For example, if the mobile device determines, at step 315, that it should not receive updated content, the follow-up request may alert the server to take no further action. In some embodiments, the mobile communication device may not send a follow-up request if receiving updated content is disallowed. Conversely, if receiving updated content is allowed, the follow-up request sent to the server at step 317 may include an indication that the updated content should be sent to mobile device from the server.

In some embodiments, the follow-up request may specify which updated content the user wishes to download. For example, the initial message at step 312 may allow the user to select less than all of the available updated content for download. Additionally, the mobile communication device may already have some of the updated content that is available on the server, in which case the mobile communication device may not need to download that content again.

In yet another embodiment, the user may specify when to download the updated content. For example, the user may wish to delay the download until some later time when the user is not placing calls, playing a game, or otherwise using the mobile communication device. The follow-up request may alert the server that the download may occur at some other time.

The follow-up request may also allow the server to track the success of promotional messages. For instance, if a high percentage of users reject downloading of updated content after being presented with a particular message, the message may be ineffective.

At step 320, the mobile communication device may receive updated content from the server. In some embodiments, this may occur while the game is operating on the mobile communication device. In other embodiments, the mobile communication device may receive the updated content at some other time. As stated previously, the user may specify when the download will occur in some embodiments.

In some embodiments, the mobile communication device may recognize certain files (of updated content) as already downloaded to the mobile communication device. In these embodiments, the mobile communication device may automatically bypass the repeated download of this updated content.

The server may track the number of mobile communication devices that have downloaded promotional content. For example, the game company may use this information to profit from each download of a third-party advertisement.

The pre-selected content may be stored on a storage medium accessible by the server. Updated content may be chosen from pre-selected content based on at least one of the factors including a type of the mobile communication device, a telecommunication service, a subscription associated with the mobile communication device, and a service provider of the telecommunication service. For example, a particular service provider may wish to provide content that includes the service provider's logo. In another example, newer mobile communication devices may be able to display a elaborate content, so distinguishing among types of mobile communication devices may allow a game provider to maximize the experience on each type of mobile communication device.

At step 325, a version identifier for the received content may be saved. This identifier may be saved on the mobile communication device, the server, both, or neither, depending on the embodiment. Saving the identifier may help prevent against downloading duplicative content updates in some embodiments. In embodiments where the server stores the version identifier, the version identifier may be stored in a database table in relation to a mobile communication device identification value. This may allow the server to verify which updated contents the mobile communication device has already received the next time the mobile device requests updated content. The identifier data may be stored on a storage medium such as described with reference to FIG. 1 (e.g., storage medium 130).

Similarly, in some embodiments, if the mobile device saves the version identifier locally, the mobile device may use the saved version identifier to request only different content versions. This may be achieved, as previously mentioned, by sending one or more version identifiers to the server at either step 310 or step 317, depending on the embodiment. Alternatively, the mobile communication device may compare available content identifiers received from the server with version identifiers on the mobile communication device, when analyzing which files to receive.

At step 330, the mobile communication device may determine the location of the content placement. In some embodiments, the downloaded updated content includes coordinates. For example, the coordinates may specify a location along the horizontal axis of the screen and the vertical axis of the screen for placing an image. In these embodiments, the actual positioning of the updated content within the viewable screen of the mobile communication device depends on the current view of the scene in which the updated content is situated. In some embodiments, such as games with three-dimensional views, the coordinates may additionally specify a location along a depth axis. In other embodiments, the coordinates may specify a fixed location on the screen of the mobile communication device.

In some embodiments, the coordinates may also include scene, level, or time information for displaying the updated content. For example, in the darts game illustrated in FIGS. 2A-B, different messages may be written on chalk board 220 when the user has been playing the game for a certain amount of time or has achieved a certain score.

In still more embodiments, the coordinates comprise a selection of one or more predefined in-game locations. For example, turning back to FIG. 2A, a first location may be where the shirt 230 is hanging, a second location may be where poster 225 is positioned, a third location may be where the dart board 210 is placed, and so on. In that embodiment, the coordinates need only identify the predefined location (rather than positions along the axes) and the mobile communication device may display the updated content at that location.

In other embodiments, the updated content may not include coordinates. For example, the mobile communication device may have a predefined location for placing updated content and not require further guidance from the server.

In some embodiments, the placement location of updated content is determined based on user interaction. For example, in the darts game shown in FIGS. 2A-B, content may be placed on dart board 210 after the user throws an object at the dartboard. User interaction may be detected by motion sensing devices within the mobile communication device to determine where the updated content is displayed within the gaming environment. For example, the user may make a throwing motion while holding the mobile communication device, which detects the motion and displays a thrown dart on dartboard 210 along with a message based upon the updated content.

At step 340, the mobile communication device may place the updated content in-game. As previously stated, this may not occur until a particular scene is displayed or a particular user interaction occurs. The content may include a message, graphics, animation, and/or sound, depending on the embodiment.

Some embodiments include an option for the user to remove in-game updated content, at step 350. Similarly, at step 360, the mobile communication device may restore original content to the game. For example, the user may be able to restore the scene 202 of FIG. 2B to the scene 200 of FIG. 2A by selecting an option within the game in some embodiments. In some embodiments, this is achieved by archiving original content on the mobile communication device. In other embodiments, original content may be archived on the server for download by the mobile communication device.

Figure 4A:
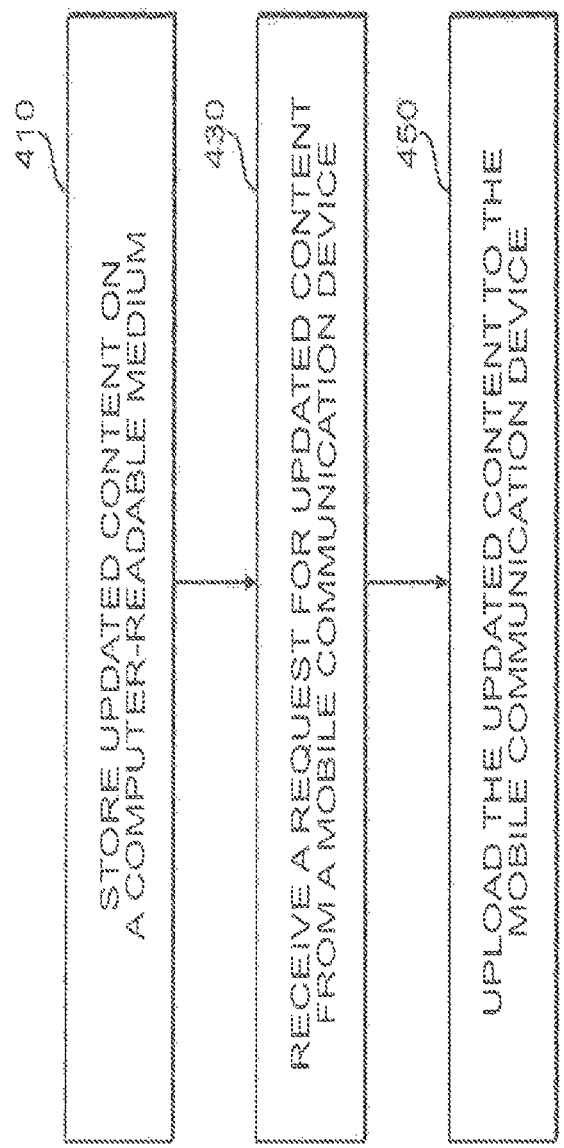
FIGS. 4A-B are exemplary flow charts that include steps taken by a server to update in-game content on a mobile communication device in accordance with an embodiment of the present invention.
Figure 4B:
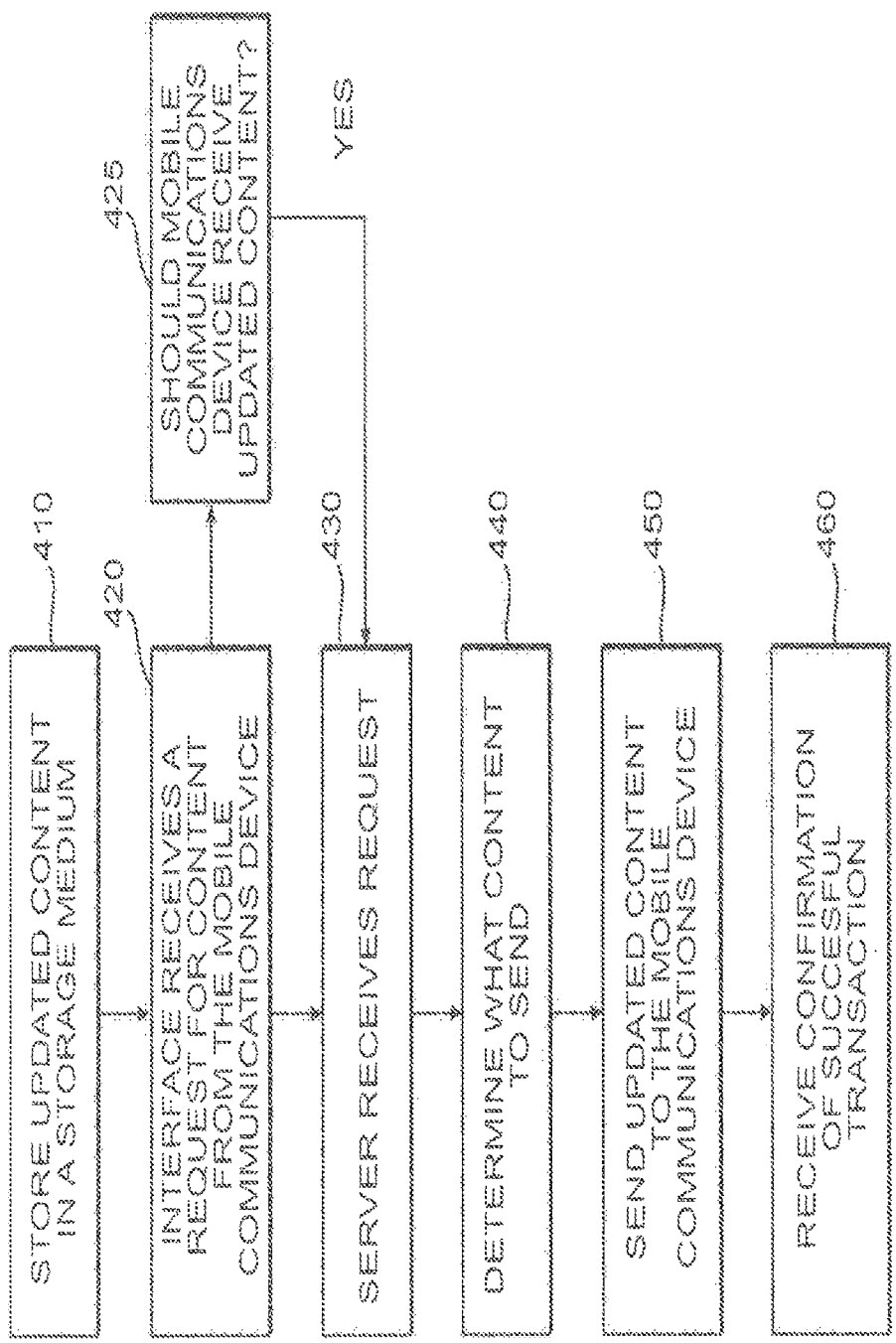

FIGS. 4A-B are exemplary flow charts that include steps taken by a server to update in-game content on a mobile communication device in accordance with an embodiment of the present invention. Turning now to FIG. 4A, the server may store updated content on a computer-readable medium in some embodiments. The computer-readable medium may be the storage medium discussed with respect to FIG. 1 (i.e., storage medium 130) in some embodiments.

At step 430, the server may receive a request for updated content from the mobile communication device. This request may be an inquiry regarding a particular game, scene, and/or element within the game. In some embodiments, the request is an inquiry for updated content for multiple mobile video games. The request may also contain a version identifier that may help the server determine what updated content the mobile communication device has already downloaded. In addition, the request may allow the server to determine the type of mobile communication device, the service subscription associated with the mobile communications device, or the service provider from which the request is received.

At step 450, the server may upload the content to the mobile communication device. In one embodiment, the updated content may be provided from pre-selected content based on the type of mobile communication device, the service subscription associated with the mobile communications device, or the service provider from which the request is received.

Turning now to FIG. 4B, a more elaborate set of steps followed by a server in some embodiments is presented. At step 410, the server may store updated content in a storage medium. In some embodiments, the updated content is indexed in a database, such as a relational database. The storage medium may be any number of types of memory or devices, such as described above with reference to FIG. 3B.

At step 420, an interface may receive a request for updated content from a mobile communications device. The interface may be configured differently depending on the embodiment, and as previously discussed with respect to FIG. 1.

In some embodiments, the request may include one or more version identification numbers. These version identification numbers may be used by the server to determine if the mobile communication device already has some or all of the updated content available for download. In those embodiments, sending the version identification number may help eliminate downloads of duplicative updated content. In other embodiments, no version identification is included in the request.

At step 425, the interface in some embodiments may verify whether the mobile communication device should receive content updates before sending the updated content. In an embodiment, the interface verifies that the mobile communication device belongs to a particular service subscription. In another embodiment, the interface may query stored data to determine whether the mobile communication device is configured to receive updated content. If the mobile communication device is configured to receive updated content, the interface may pass the request to the server. In some embodiments, the server will receive the request without (or regardless of) any querying by the interface. In other embodiments, the verification is handled after the server receives the request.

The server may receive the request at step 430. In some embodiments step 420 and 430 are combined.

At step 440, the server may attempt to determine what content should be sent to the mobile communication device. For example, the determination may be based on the model type of the mobile communication device, the service plan or subscription to which the mobile device belongs, the service provider that provides the plan to the mobile device, the base location of the mobile device, the current location of the mobile device, which updates the mobile device has already received, and/or other criteria associated with the user or the mobile communications device.

In an embodiment, the server uses the base location of the mobile communication device to provide localized promotional content. For example, the server may query a database of content using the area code of the mobile communication device to promote businesses that are in or near the area code. Similarly, the mobile communication device may report its current location to the server. In some of those embodiments, the server may determine updated content to send to the mobile communication device includes promotional content for businesses near the mobile communication device's current location. The promotion content, for example, may be organized into geographical zones. Therefore, in one aspect, choosing the updated content to upload to the mobile communications device may involve determining which geographical zone the mobile communication device currently or previously belonged to.

The server may also add an element of randomness to the selection of updated content in some embodiments. In these embodiments, more than one promotional item may be eligible for placement in an in-game scene or location, and the server may choose what updated content to send based at least partially on chance. In another similar embodiment, the server may send content to one or more mobile communication devices on a rotational basis. For example, if content A was previously sent to a mobile communication device, content B may be sent to the next mobile communication device to contact the server. In this way, the server may take turns selecting which content to send to a mobile communication device that requests updated content.

At step 450, the updated content may be sent to the mobile communication device. The updated content may be sent immediately in some embodiments, or it may be sent at some other time. In addition, some updated content may be sent in different download blocks. In this way, the mobile communication device may be able to display some updated content before all of the updated content is received.

The server may also track the number of times promotional content is sent, as previously mentioned.

In some embodiments, at step 460, the mobile communication device may send a confirmation to the server indicating a successful transaction. In embodiments comprising a server that tracks what updated content the mobile communication device has already received, the server may not count the updated content as received until the confirmation is returned. In some embodiments, the server receives confirmation when the last of the updated content data is transferred to the mobile communication device. In yet another embodiment, the mobile communication device chooses which content to display from a pool of content already downloaded.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A system for providing updated content associated with a mobile video game to a mobile communication device, the system comprising:
   a storage medium for storing pre-selected in-game advertising for use in a video game;
   a server in communication with the storage medium; and
   an interface coupled to the server and a network, wherein the interface receives a request for updated content from the mobile communication device over the network;
   wherein the server is operative to receive the request through the interface and utilize the request to:
   check what pre-selected in-game advertising to send; and
   send the pre-selected in-game advertising stored on the storage medium to the mobile communication device as the updated content for the mobile video game.

2. The system of claim 1, wherein the updated content is promotional content.

3. The system of claim 1, wherein the server sends information to the mobile communication device regarding the in-game placement location of the content, the information being part of the updated content.

4. The system of claim 1, wherein the server sends a message to the mobile communication device in response to receiving the request, the message relating to the content.

5. The system of claim 4, wherein the message is pre-selected by the server based on a model type associated with the mobile communication device, a service subscription associated with the mobile communication device, or a service provider for the service subscription associated with the mobile communication device.

6. The system of claim 1, wherein the server checks whether the mobile communication device should receive the updated content before sending the updated content to the mobile communication device.

7. The system of claim 1, wherein the server tracks the distribution of updated content.

8. A method for providing updated content associated with a mobile video game to a mobile communication device, the method comprising:
   storing pre-selected in-game advertising for use in a video game on a storage medium;
   receiving, at an interface coupled to a server and a network, a request for updated content from the mobile communication device over the network;
   receiving the request at the server through the interface; and utilizing the request to:
   identify what pre-selected in-game advertising to send; and
   send the pre-selected in-game advertising stored on the storage medium to the mobile communication device as the updated content for the mobile video game.

9. The method of claim 8, wherein the updated content is promotional content.

10. The method of claim 8, further comprising sending information from the server to the mobile communication device regarding the in-game placement location of the content, the information being part of the updated content.

11. The method of claim 8, further comprising sending a message from the server to the mobile communication device in response to receiving the request, the message relating to the content.

12. The method of claim 11, wherein the message is pre-selected by the server based on a model type associated with the mobile communication device, a service subscription associated with the mobile communication device, or a service provider for the service subscription associated with the mobile communication device.

13. The method of claim 8, further comprising checking whether the mobile communication device should receive the updated content before sending the updated content to the mobile communication device.

14. The method of claim 8, further comprising tracking the distribution of updated content at the server.

* * * * *

UNITED STATES PATENT AND TRADEMARK OFFICE
CERTIFICATE OF CORRECTION

PATENT NO. : 10,617,958 B2
APPLICATION NO. : 15/645028
DATED : April 14, 2020
INVENTOR(S) : Joshua Hartwell et al.

It is certified that error appears in the above-identified patent and that said Letters Patent is hereby corrected as shown below:

On the Title Page

Inventor information in item (75) should read as follows:
Joshua Hartwell, Santa Monica, CA (US); Paul Bolten, Playa del Rey, CA (US)

Signed and Sealed this
Twentieth Day of June, 2023

Katherine Kelly Vidal
*Director of the United States Patent and Trademark Office*